United States Patent [19]

Kotani et al.

[11] Patent Number: 4,951,156

[45] Date of Patent: Aug. 21, 1990

[54] FACSIMILE CIRCUIT MONITOR SYSTEM

[75] Inventors: Matahira Kotani; Masafumi Matsumoto, both of Nara; Masanori Morigami, Yamatokoriyamashi; Masayuki Hachinoda, Nara, all of Japan

[73] Assignee: Sharp Kabushiki Kaisha, Osaka, Japan

[21] Appl. No.: 248,911

[22] Filed: Sep. 26, 1988

[30] Foreign Application Priority Data

Sep. 28, 1987 [JP] Japan ................... 62-244984

[51] Int. Cl.⁵ ............................................. H04N 1/00
[52] U.S. Cl. .................................... 358/404; 358/434
[58] Field of Search ............... 358/256, 257, 400, 404, 358/434, 435, 479; 379/100; 381/107

[56] References Cited

U.S. PATENT DOCUMENTS

| | | |
|---|---|---|
| 4,000,365 | 12/1976 | Vandling . |
| 4,196,447 | 4/1980 | Dalke ................................... 358/445 |
| 4,402,016 | 8/1983 | Muller .................................. 358/280 |
| 4,413,287 | 11/1983 | Torpie et al. ....................... 358/257 |
| 4,432,020 | 2/1984 | Onose et al. . |
| 4,623,934 | 11/1986 | Taylor ................................. 358/256 |
| 4,802,008 | 1/1989 | Walling ............................... 358/434 |
| 4,805,011 | 2/1989 | Sase ...................................... 358/44 |
| 4,811,385 | 3/1989 | Watanabe ............................ 358/434 |

FOREIGN PATENT DOCUMENTS 3014687 10/1980 Fed. Rep. of Germany .
0145272 8/1983 Japan .

Primary Examiner—James J. Groody
Assistant Examiner—Kim Yen Vu

[57] ABSTRACT

In a facsimile circuit monitor system, a control signal to be transmitted or received is initially converted into an easily stored code to be stored in a memory. When a certain signal has been received, a signal level is calculated on the basis of actual gain of an AGC (automatic gain control) and stored in the memory so that information stored in the memory may be outputted.

2 Claims, 2 Drawing Sheets

FACSIMILE CIRCUIT MONITOR SYSTEM

BACKGROUND OF THE INVENTION

1. Field of the Invention

The present invention relates to a communication control for a facsimile machine.

2. Description of the Prior Art

Conventionally, various external instruments, for example, protocol monitor devices, level meters and the like are used to monitor communication conditions associated with a facsimile machine.

When a communication disturbance takes place in the facsimile machine, use of the external instruments to monitor the conditions disturbs rapid cause analysis.

SUMMARY OF THE INVENTION

Accordingly, the present invention has been developed with a view to substantially eliminate the above described disadvantage inherent in the prior art facsimile circuit monitor systems, and has for its essential object to provide an improved facsimile circuit monitor system which enables an operator to quickly recognize communication conditions by sequentially displaying information stored in a memory on a display portion or by collectively outputting the information from an output portion after communication.

In accomplishing this and other objects, a facsimile circuit monitor system according to one preferred embodiment of the present invention a control signal to be transmitted or received is converted into a code more easily stored in memory, a signal level is calculated on the basis of actual gain of an AGC (automatic gain control) after signal has been received, and is stored in the memory so that information stored in the memory may be outputted.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

A facsimile machine functions to transmit and receive signals. These functions are primarily used in communication. In this respect, when a signal used in a communication has been transmitted or received, the signal is, not stored as is but is stored by converting it into a more easily recognizable code to be stored in memory. In coding the signal, a facsimile control field (FCF) in a binary coded signal is utilized. A digital identification signal (DIS) and a digital command signal (DCS) are also stored in the memory, since these signals contain useful information (FIF: facsimile information field) for information interchange. During communication, the contents of the memory are displayed in abbreviated form on the basis of a coded FCF signal as occasion demands. When the communication has been completed, the contents of the memory are converted into abbreviated form and outputted to a recording portion in the order of transmission or reception. The foregoing is a system for monitoring a facsimile communication control procedure.

In a system for monitoring a signal receiving level, when a training check (TCF) signal or a message carrier has been received, actual gain of an AGC (automatic gain control) of a MODEM (modulator and demodulator) is initially read out. A decibel value is then calculated with the use of a conversion table on the basis of this gain and is stored in the memory.

Figure 1:
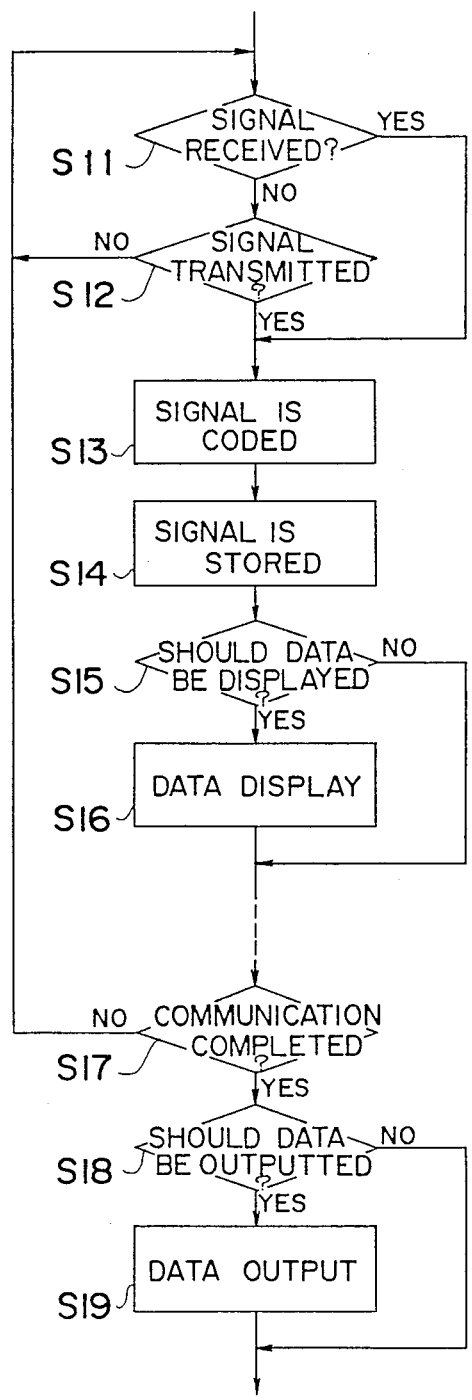
FIG. 1 is a flow-chart indicative of the processing procedure for the disclosed system for monitoring facsimile communication control procedure.

FIG. 1 is a flow-chart processing procedure for the disclosed system of monitoring facsimile communication and control procedure.

When a signal has been received at step s11 or transmitted at step s12, it is coded at step s13 and at step s14 stored in a memory. It is when judged at step s15 whether or not data stored in the memory is requested to be displayed. If the judgement at step s15 is YES, the data is displayed on a display portion at step s16 followed by other processing. It is judged at step s17 whether or not the communication has been completed. The procedure from step s11 to step s17 is repeated until all the signals are either transmitted or received. Upon completion of the communication, it is judged at step s18 whether or not the data stored are requested to be collectively outputted. If the judgement at step s18 is YES, the data are outputted to the recording portion at step s19.

Figure 2:
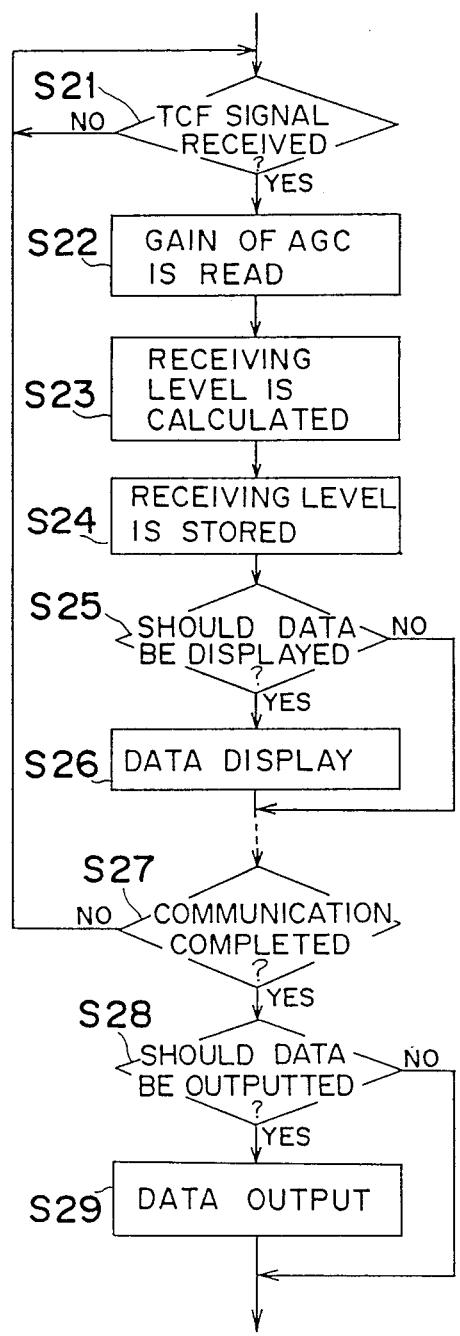
FIG. 2 is a flow-chart indicative of the processing procedure in a system for monitoring a signal receiving level.

FIG. 2 is a flow-chart illustrating the processing procedure for the disclosed system for monitoring the signal receiving level.

When a TCF signal has been received at step s21, gain of the AGC of the MODEM is read out at step s22 followed by step s23 at which a receiving level is calculated from a reference table. The resultant calculated value for the receiving level is stored in memory at step s24 followed by step s25 at which it is judged whether or not the data stored in memory are requested to be displayed. If the judgement at step s25 is YES, the data are displayed on a display portion at step s26 followed by other processing. It is judged at step s27 whether or not the communication has been completed. The procedure from step s21 to step s27 is repeated until the procedure ends. Upon completion of the communication, it is judged at step s28 whether or not the data stored are requested to be collectively outputted. If the judgement at step s28 is YES, the data are outputted to the recording portion at step s29.

From the foregoing, according to the present invention, since the facsimile machine is provided with means for monitoring a circuit, circuit conditions can be readily known without using any external instruments. Accordingly, cause analysis can be rapidly executed particularly in case of communication disturbance.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An internal communication control circuit for a facsimile machine, comprising:

input means for receiving data signals, each of said data signals having a control data field and an information data field;

means responsive to said input means for converting each said data signal in said control data field into coded data for easy storage;

memory means responsive to said means for converting for storing said coded data;

monitor means for monitoring the signal level of said inputted data signals by calculating the actual gain of an AGC (automatic gain control) as said data signals are received by said input means;

output means responsive to said monitor means for outputting said coded data stored in said memory means once an optional level of AGC is exceeded by the signal level of said data signal; and display means responsive to said output means for displaying said coded data.

2. A method for communication control in a facsimile machine; comprising:

inputting data signals, each of said data signals having a control data field and an information data field;

converting said control data field of said data signal into coded data for easy storage;

storing said coded data in a memory;

monitoring the signal level of said inputted data signals by calculating the actual gain of an AGC (automatic gain control) as said data signals are received by said input means;

outputting said coded data stored in said memory once an optimal level of AGC is exceeded by said signal level of said data signal; and displaying said outputted coded data.

* * * * *